April 23, 1957 L. J. WOLF 2,789,707
PIPE LOADING AND UNLOADING MECHANISM FOR VEHICLES
Filed Oct. 15, 1954 2 Sheets-Sheet 1
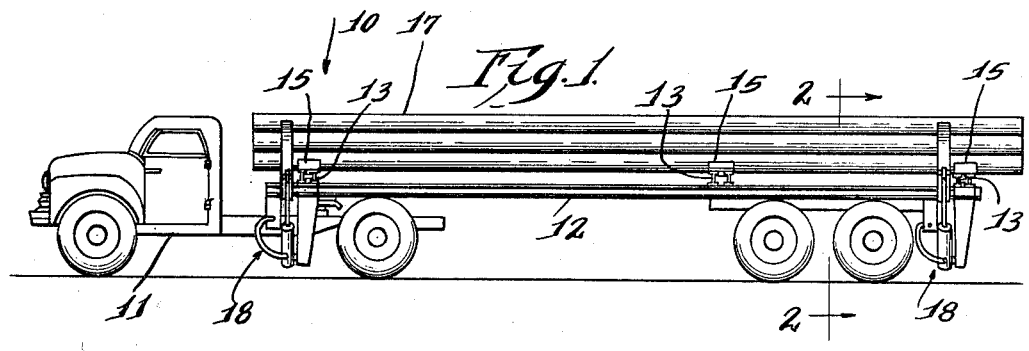
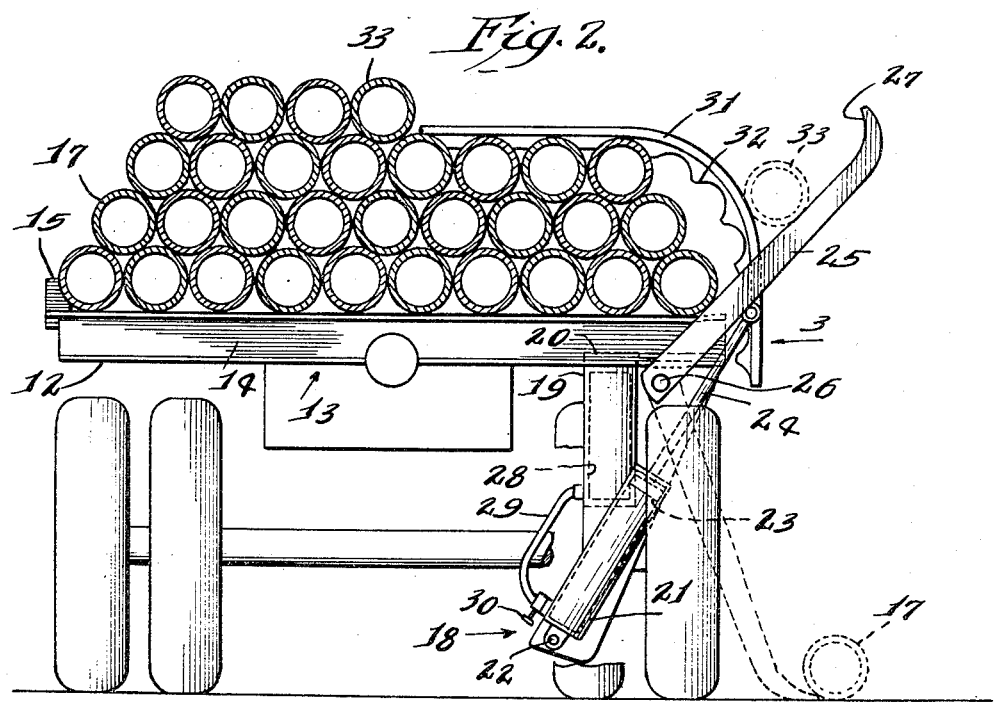
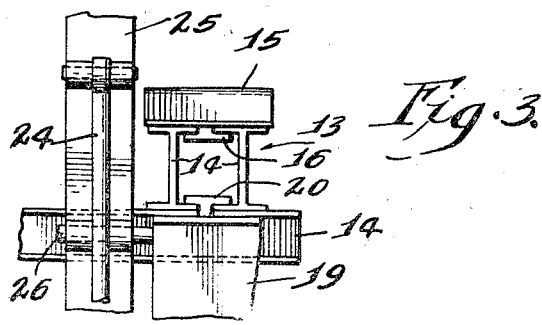
Inventor.
Lloyd J. Wolf.
By John W. Dailey
Attorney.

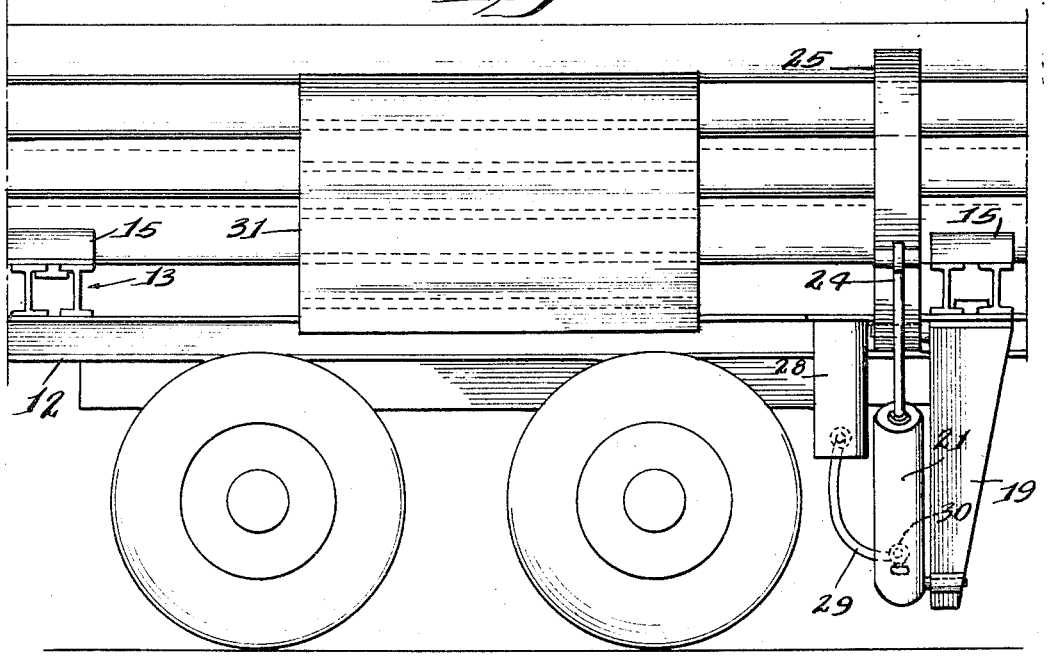
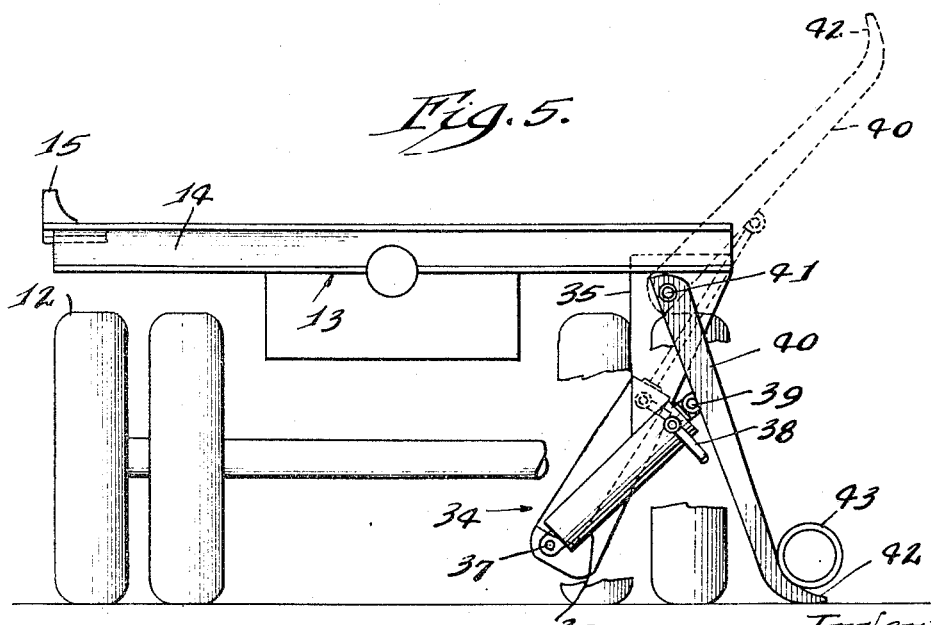

United States Patent Office 2,789,707
Patented Apr. 23, 1957

2,789,707

PIPE LOADING AND UNLOADING MECHANISM FOR VEHICLES

Lloyd J. Wolf, Irving, Tex.

Application October 15, 1954, Serial No. 462,456

4 Claims. (Cl. 214—77)

My invention relates to mechanism for facilitating the loading and unloading of lengths of pipe on and from a pipe carrying vehicle.

While not restricted thereto, the invention is best exemplified in pipe stringing and pipe collecting operations in the oil fields. As now practiced in stringing operations, a pipe laden trailer is moved beside the line along which the pipe is to be laid accompanied by a crane which lifts from the trailer in each stopping position thereof a length of pipe for deposit on the ground. In pipe collecting operations wherein excess pipe lengths are picked up for restacking, the above method is reversed. Each of these operations requires a separate, mobile crane with its operator and two other men for hooking or unhooking to or from a pipe length the cable suspension which depends from the end of the crane boom.

It is therefore the principal object of my invention to eliminate the separate crane and its operator by providing a mechanism detachably mounted on a pipe trailer and operable from an upper position to receive a pipe rolled thereon from the trailer and to lower the same under a braking restraint for deposit on the ground, and from a lower or ground position to receive and raise a pipe for rolling on the trailer.

These and further objects of the invention will be set forth in the following specification, reference being had to the accompanying drawings, and the novel means by which said objects are effectuated will be definitely pointed out in the claims.

In the drawings:

Fig. 1 is a side elevation of a typical pole or pipe, tractor trailer equipped with one form of the pipe unloading mechanism.

Fig. 2 is an enlarged section along the line 2—2 in Fig. 1 showing the trailer partly unloaded.

Fig. 3 is an enlarged detail looking in the direction of the arrow 3 in Fig. 2.

Fig. 4 is an enlarged, side elevation of the rear part of the trailer as viewed in Fig. 1.

Fig. 5 is a view of an unloaded trailer similar to the view shown in Fig. 2, but showing the application of a hydraulic jack which may be used for loading or unloading.

Referring to Figs. 1 to 3, the numeral 10 designates a conventional pole or pipe carrying vehicle including a tractor 11 and a trailer 12. The latter is ordinarily conditioned for the transportation of pipe by the affixation of so-called bolsters 13 to the trailer frame, each of which consists of a pair of spaced I-beams 14—14 which extend transversely of the frame with a spacing of about one inch between the adjacent flanges. Two of the bolsters 13 are usually symmetrically spaced above the dual axle assembly of the trailer 12 and another one above the fifth wheel plate of the tractor 11, all as shown in Fig. 1. Lugs 15 are slidable on the tops of the bolsters 13 and have a guide piece 16 which extends between the adjacent I-beams 14. These lugs are suitably held in any desired position dependent upon the extent of the lading and serve to retain the lower row of the pipes 17 against rolling off the trailer 12.

The above bolster arrangement is utilized as a convenient support for my improved loading and unloading mechanism. In Fig. 1 two mechanisms 18 are shown which only unload and are located adjacent the opposite ends, respectively, of and on one side of the trailer.

Specifically, and referring to Figs. 2 and 3, each unloading mechanism 18 includes a frame 19 which depends from the frame of the trailer 12 with its upper end having a guide and support piece 20 which extends between the lower flanges of the I-beams 14 in each bolster 13 and rests on these flanges. The lower end of a cylinder 21 is pivotally connected at 22 to the lower part of the frame 19 and operable in the cylinder is a piston 23 having a piston rod 24 which extends through the opposite and free end of the cylinder 21 for pivotal connection to an intermediate part of an arm 25. The latter is end pivoted at 26 to the upper part of the frame 19 and the opposite or free end of the arm 25 is slightly hooked at 27 in a direction curving towards the trailer when the arm is in the upper position shown in Fig. 2. The frame 19 also carries an oil reservoir 28 whose bottom connects through a hose 29 and a valve 30 with the lower end of the cylinder 21.

To position the mechanism for unloading and considering one mechanism 18, the valve 30 is opened and the arm 25 is swung to the full line position shown in Fig. 2 to thereby permit oil to flow from the reservoir 19 into the cylinder 21 and the valve 30 is thereafter closed. The arm 25 is then held in the upper or pipe receiving position by the oil trapped in the cylinder 21.

For unloading and since Fig. 2 shows an intermediate stage thereof, it will be assumed that the top row of pipes 17 in this figure is completed by the addition of three other pipes. The right hand pipe of this addition is pried for rolling movement, such as by crow bars or the like, so that it is shifted for support by the front and rear arms 25. The valves 30 are then slightly opened to provide for a throttling release of the oil in the cylinders 21 and thus a controlled descent of the arms 25, each to the dotted position shown in Fig. 2. Any commercial type of valve that meets the above requirements may be used to control the oil flow between the reservoir 19 and the cylinder 21.

After the above first pipe in the top row is removed, it will be apparent that the rolling of other pipes in this row towards the arms 25 would require considerable effort due to the dropping of the pipe being moved into the depressions between pairs of pipes in the subjacent row. This difficulty increases as the number of pipes in the top row diminishes and the problem is also present in all of the rows.

To facilitate movements of the pipes 17 towards the arms 25, a length of belting 31 of appropriate width is employed and as many of these beltings lengthwise of the trailer may be used as desired. The top side of the belting is smooth and its other side has attached thereto a serrated block formation 32 having spaced curvatures for fitting the size of pipe being handled.

Each time that a pipe 17 is removed, the belting 31 is shifted one position and in Fig. 2 is shown the relation of the several parts after three pipes have been rolled from the top row. It will be apparent that the next pipe in this row, designated by the numeral 33, need only be lifted out of the depression between the subjacent pair of pipes on to the belting 31. Thereafter, the pipe 33 may be rolled freely along the beltings to rest on the arms 25 in the full line position thereof shown in Fig. 2. During this movement, the hanging portions of the beltings 31 may be deflected somewhat from the position shown by the weight of the pipe 33. When the bottom row of pipes is reached, the retaining lugs 15 on the unloading side are removed.

In Fig. 5 is shown a variant form of the mechanism, designated generally by the numeral 34, which may be used for loading and unloading, but is particularly shown for the former. It includes a depending frame 35 whose upper end may be arranged for guidable support by the end of a bolster 13 in the manner shown for the frame 19 in Fig. 3, and one such frame being mounted at each end of the trailer 12 on one side thereof. The lower end of a commercial form of hydraulic jack 36 is pivotally connected at 37 to the lower part of the frame 35 and its operation is effected by the usual handle 38. The external actuating element of the jack pivotally connects at 39 to an intermediate point of an arm 40 which pivotally connects at one end 41 to the upper part of the frame 35 while the opposite end is slightly hook shaped at 42. In other words, the arm 40 may be shaped like the arm 25.

For loading, the arms 40 occupy their lower position and a pipe 43 is rolled generally into the position shown in Fig. 5 and held there temporarily by a simple chain and hook (not shown) which extends around the pipe and connects with each of the arms 40, i. e., forwardly and rearwardly of the trailer. The jacks 36 are then operated in the usual manner to raise the arms 40 and when the latter are high enough that the hooks 42 prevent rolling of the pipe off the arms, the chains and hooks are removed and the lifting operation is continued until the pipe 43 is rolled on the bolsters 13. The operation of the jacks 36 are then reversed to lower the arms 40 to receive the next pipe. After the first or bottom row of pipes has been deposited on the trailer, the belting 31 may be used to facilitate the rolling of pipes in the assembly of additional rows.

From the foregoing, it will be apparent that the jacks 36 may be used for unloading as well as loading. The conventional hydraulic jack includes its own reservoir of oil and devices for controlling the lowering and raising of its load actuating element. Therefore, considering an unloading operation with the arm 40 initially in the dotted position shown in Fig. 4, the jack 36 would be conditioned in the well known manner to effect a controlled descent of the arm 40 by working the handle 40.

In each of the above modifications, the raising and/or lowering assembly is fashioned in a unit device that is capable of being carried and mounted on the trailer by one man. While the detachable mounting shown provides a convenient arrangement for bolster equipped trailers, it will be understood that the devices may be otherwise attached as by bolting.

I claim:

1. The combination of a vehicle adapted for the carriage of pipe, a plurality of bolster means on which the pipe rests extending transversely and spaced longitudinally of the vehicle, each bolster means including a pair of beams having lower flanges spaced to provide a gap therebetween, a frame depending from each end of the vehicle at one side thereof and having a part detachably extending through the gap for guiding support on the associated, lower flanges, an arm pivoted on each frame and swingable between upper and lower positions, and means for controlling the rising and descending movements of the arms.

2. The combination of a vehicle adapted for the carriage of pipe, a plurality of bolster means on which the pipe rests extending transversely and spaced longitudinally of the vehicle, each bolster means including a pair of beams having lower flanges spaced to provide a gap therebetween, a frame depending from each end of the vehicle at one side thereof and having a part detachably extending through the gap for guiding support on the associated, lower flanges, an oil reservoir carried by each frame, an arm pivoted at one end on each frame and swingable between upper and lower, pipe receiving and discharging positions, respectively, a cylinder having its lower end disposed below each reservoir and pivoted on the frame, a piston slidable in each cylinder and connected to an intermediate part of the associated arm, and a hose connection between each reservoir and the lower end of the associated cylinder including a valving means for throttling the descent of the adjacent arm when carrying a pipe.

3. The combination of a vehicle adapted for the carriage of pipe, a plurality of bolster means on which the pipe rests extending transversely and spaced longitudinally of the vehicle, each bolster means including a pair of beams having lower flanges spaced to provide a gap therebetween, a frame depending from each end of the vehicle at one side thereof and having a part detachably extending through the gap for guiding support on the associated, lower flanges, an arm pivoted on each frame and swingable between upper and lower positions, and means for controlling the descending movements of the arms.

4. The combination of a vehicle adapted for the carriage of pipe, a plurality of bolster means on which the pipe rests extending transversely and spaced longitudinally of the vehicle, each bolster means including a pair of beams having lower flanges spaced to provide a gap therebetween, a frame depending from each end of the vehicle at one side thereof and having a part detachably extending through the gap for guiding support on the associated, lower flanges, an arm pivoted on each frame and swingable between upper and lower positions, and hydraulic jack means carried by each frame for controlling the rising and descending movements of the associated arm.

References Cited in the file of this patent

UNITED STATES PATENTS

| | | |
|---|---|---|
| 2,496,388 | Gilbey | Feb. 7, 1950 |
| 2,525,735 | Symons | Oct. 10, 1950 |
| 2,617,547 | Pridy | Nov. 11, 1952 |
| 2,676,715 | Pridy | Apr. 27, 1954 |
| 2,683,541 | Bailey | July 13, 1954 |
| 2,703,656 | Banks | Mar. 8, 1955 |